United States Patent
Gronvall et al.

(10) Patent No.: US 7,903,923 B2
(45) Date of Patent: Mar. 8, 2011

(54) DROP TERMINAL RELEASABLE ENGAGEMENT MECHANISM

(75) Inventors: Erik Gronvall, Bloomington, MN (US);
Paula Rudenick, Eden Prairie, MN (US); Yu Lu, Eden Prairie, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 12/248,612

(22) Filed: Oct. 9, 2008

(65) Prior Publication Data
US 2009/0123115 A1 May 14, 2009

Related U.S. Application Data

(60) Provisional application No. 60/978,642, filed on Oct. 9, 2007.

(51) Int. Cl.
*G02B 6/00* (2006.01)
*G02B 6/36* (2006.01)

(52) U.S. Cl. .............. 385/135; 385/76; 385/77; 385/139

(58) Field of Classification Search .............. 385/76, 385/77, 134–137, 139
See application file for complete search history.

(56) References Cited

U.S. PATENT DOCUMENTS

| | | |
|---|---|---|
| 4,453,291 A | 6/1984 | Fidrych |
| 4,478,486 A | 10/1984 | Fentress et al. |
| 4,648,168 A | 3/1987 | Nolf et al. |
| 4,652,072 A | 3/1987 | Arasi, Jr. |
| 4,684,221 A | 8/1987 | Takada |
| 4,685,764 A | 8/1987 | Hoffer et al. |
| 4,717,231 A | 1/1988 | Dewez et al. |
| 4,744,622 A | 5/1988 | Cherry et al. |
| 4,761,052 A | 8/1988 | Buekers et al. |
| 4,805,979 A | 2/1989 | Bossard et al. |
| 4,838,643 A | 6/1989 | Hodges et al. |
| 4,908,482 A | 3/1990 | Shimirak et al. |
| 4,911,662 A | 3/1990 | Debortoli et al. |
| 4,913,522 A | 4/1990 | Noff et al. |
| 4,958,903 A | 9/1990 | Cobb et al. |
| 4,986,762 A | 1/1991 | Keith |
| 5,029,958 A | 7/1991 | Hodge et al. |
| 5,046,811 A | 9/1991 | Jung et al. |
| 5,048,916 A | 9/1991 | Caron |

(Continued)

FOREIGN PATENT DOCUMENTS

EP 0 293 183 A2 11/1988

(Continued)

OTHER PUBLICATIONS

International Search Report and Written Opinion mailed Jul. 14, 2009.

(Continued)

*Primary Examiner* — Daniel Petkovsek
(74) *Attorney, Agent, or Firm* — Merchant & Gould P.C.

(57) ABSTRACT

A terminal for mounting to a fiber distribution cable includes a base and a cover releasably engaged to the base by a releasable engagement mechanism. The releasable engagement mechanism includes a resilient latch having a base end and a free end. The free end defines a plurality of openings. The releasable engagement mechanism further includes a plurality of protrusions having a lip and a sloped surface. The plurality of protrusions is adapted for engagement with the plurality of openings of the resilient latch.

5 Claims, 8 Drawing Sheets

U.S. PATENT DOCUMENTS

| | | | |
|---|---|---|---|
| 5,076,656 A * | 12/1991 | Briggs et al. ............... 385/71 |
| 5,097,529 A | 3/1992 | Cobb et al. |
| 5,097,530 A | 3/1992 | Holt et al. |
| 5,122,069 A | 6/1992 | Brownlie et al. |
| 5,129,030 A | 7/1992 | Petrunia |
| 5,133,038 A | 7/1992 | Zipper |
| 5,133,039 A | 7/1992 | Dixit |
| 5,155,794 A | 10/1992 | Nolf et al. |
| 5,185,845 A | 2/1993 | Jones |
| 5,208,893 A | 5/1993 | McCall et al. |
| 5,212,761 A | 5/1993 | Petrunia |
| 5,214,735 A | 5/1993 | Henneberger et al. |
| 5,222,183 A | 6/1993 | Daems et al. |
| 5,231,687 A | 7/1993 | Handley |
| 5,235,665 A | 8/1993 | Marchesi et al. |
| 5,249,253 A | 9/1993 | Franckx et al. |
| 5,267,122 A | 11/1993 | Glover et al. |
| 5,278,931 A | 1/1994 | Antos et al. |
| 5,323,480 A | 6/1994 | Mullaney et al. |
| 5,363,465 A | 11/1994 | Korkowski et al. |
| 5,367,598 A | 11/1994 | Devenish, III et al. |
| 5,396,575 A | 3/1995 | Hayward et al. |
| RE34,955 E | 5/1995 | Anton et al. |
| 5,439,395 A | 8/1995 | Laukzemis |
| 5,446,823 A | 8/1995 | Bingham et al. |
| 5,479,533 A | 12/1995 | Tanaka |
| 5,479,553 A | 12/1995 | Daems et al. |
| 5,480,203 A | 1/1996 | Favalora et al. |
| 5,509,099 A | 4/1996 | Hermsen et al. |
| 5,515,472 A | 5/1996 | Mullaney et al. |
| 5,525,756 A | 6/1996 | Mullaney et al. |
| 5,530,787 A | 6/1996 | Arnett |
| 5,535,298 A | 7/1996 | Fasnacht et al. |
| D372,897 S | 8/1996 | Curry et al. |
| 5,546,495 A | 8/1996 | Bruckner et al. |
| 5,556,060 A | 9/1996 | Bingham et al. |
| 5,566,268 A | 10/1996 | Radliff et al. |
| 5,566,269 A | 10/1996 | Eberle, Jr. et al. |
| 5,577,151 A | 11/1996 | Hoffer |
| 5,602,954 A | 2/1997 | Nolf et al. |
| 5,613,030 A | 3/1997 | Hoffer et al. |
| 5,633,973 A | 5/1997 | Vincent et al. |
| 5,634,822 A | 6/1997 | Gunnell |
| 5,640,482 A | 6/1997 | Barry et al. |
| 5,647,045 A * | 7/1997 | Robinson et al. ............ 385/135 |
| 5,659,650 A | 8/1997 | Arnett |
| 5,661,841 A | 8/1997 | Van Noten |
| 5,689,607 A | 11/1997 | Vincent et al. |
| 5,692,299 A | 12/1997 | Daems et al. |
| 5,701,380 A | 12/1997 | Larson et al. |
| 5,732,180 A | 3/1998 | Kaplan |
| 5,734,776 A | 3/1998 | Puetz |
| 5,745,633 A | 4/1998 | Giebel et al. |
| 5,754,723 A | 5/1998 | Fremgen |
| 5,758,003 A | 5/1998 | Wheeler et al. |
| 5,758,004 A | 5/1998 | Alarcon et al. |
| 5,764,843 A | 6/1998 | Macken et al. |
| 5,764,844 A | 6/1998 | Mendes |
| 5,777,268 A | 7/1998 | Allen et al. |
| 5,778,122 A | 7/1998 | Giebel et al. |
| 5,781,678 A | 7/1998 | Sano et al. |
| 5,790,740 A * | 8/1998 | Cloud et al. ............... 385/135 |
| 5,825,960 A | 10/1998 | Woodward et al. |
| 5,828,807 A | 10/1998 | Tucker et al. |
| 5,863,083 A | 1/1999 | Giebel et al. |
| 5,879,197 A | 3/1999 | Dewey |
| 5,886,300 A | 3/1999 | Strickler |
| 5,892,870 A | 4/1999 | Fingler et al. |
| 5,894,540 A | 4/1999 | Drewing |
| 5,903,698 A | 5/1999 | Poremba et al. |
| 5,907,653 A | 5/1999 | Burek et al. |
| 5,911,027 A | 6/1999 | Macken et al. |
| 5,917,648 A | 6/1999 | Harker |
| 5,933,563 A | 8/1999 | Schaffer et al. |
| 5,975,769 A | 11/1999 | Larson et al. |
| 5,982,971 A | 11/1999 | Amirkalali |
| 5,995,700 A * | 11/1999 | Burek et al. ............... 385/135 |
| RE36,592 E | 2/2000 | Giebel et al. |
| 6,160,946 A | 12/2000 | Thompson et al. |
| 6,167,183 A | 12/2000 | Swain |
| 6,175,079 B1 | 1/2001 | Johnston et al. |
| 6,208,796 B1 | 3/2001 | Williams |
| 6,215,939 B1 | 4/2001 | Cloud |
| 6,250,816 B1 | 6/2001 | Johnston et al. |
| 6,259,024 B1 | 7/2001 | Daoud |
| 6,263,142 B1 | 7/2001 | Mardirossian et al. |
| 6,275,639 B1 | 8/2001 | Bolt et al. |
| 6,275,640 B1 | 8/2001 | Hunsinger et al. |
| 6,292,614 B1 | 9/2001 | Smith et al. |
| 6,300,562 B1 | 10/2001 | Daoud |
| 6,363,200 B1 | 3/2002 | Thompson et al. |
| 6,396,989 B1 | 5/2002 | Johnston et al. |
| 6,424,782 B1 | 7/2002 | Ray |
| 6,439,779 B1 | 8/2002 | Hafer |
| 6,453,106 B1 | 9/2002 | Glaser et al. |
| 6,476,327 B1 * | 11/2002 | Bernard et al. ............... 174/101 |
| 6,504,986 B1 | 1/2003 | Wambeke et al. |
| 6,504,987 B1 | 1/2003 | Macken et al. |
| 6,507,691 B1 | 1/2003 | Hunsinger et al. |
| 6,535,682 B1 | 3/2003 | Puetz et al. |
| 6,575,792 B2 | 6/2003 | Henneberger et al. |
| 6,579,014 B2 | 6/2003 | Melton et al. |
| 6,621,975 B2 | 9/2003 | Laporte et al. |
| 6,648,520 B2 | 11/2003 | McDonald et al. |
| 6,661,961 B1 | 12/2003 | Allen et al. |
| 6,728,451 B2 | 4/2004 | Kordahi |
| 6,760,531 B1 | 7/2004 | Solheid et al. |
| 6,763,170 B2 | 7/2004 | Kordahi et al. |
| 6,766,094 B2 | 7/2004 | Smith et al. |
| 6,788,846 B2 | 9/2004 | Hileman et al. |
| 6,804,447 B2 * | 10/2004 | Smith et al. ............... 385/134 |
| 6,880,986 B2 | 4/2005 | Mynatt et al. |
| 6,899,467 B2 | 5/2005 | McDonald et al. |
| 6,926,449 B1 | 8/2005 | Keenum et al. |
| 6,993,237 B2 | 1/2006 | Cooke et al. |
| 7,013,074 B2 | 3/2006 | Battey et al. |
| 7,072,559 B2 | 7/2006 | Giordano et al. |
| 7,120,347 B2 | 10/2006 | Blackwell, Jr. et al. |
| 7,142,764 B2 | 11/2006 | Allen et al. |
| 7,263,265 B2 | 8/2007 | Grubish et al. |
| 7,292,763 B2 | 11/2007 | Smith et al. |
| 7,298,952 B2 | 11/2007 | Allen |
| 7,300,215 B2 * | 11/2007 | Hsiao et al. ............... 385/92 |
| 7,333,708 B2 | 2/2008 | Blackwell, Jr. et al. |
| 7,340,145 B2 | 3/2008 | Allen |
| 7,356,237 B2 | 4/2008 | Mullaney et al. |
| 7,397,997 B2 | 7/2008 | Ferris et al. |
| 7,400,815 B2 | 7/2008 | Mertesdorf et al. |
| 7,480,437 B2 | 1/2009 | Ferris et al. |
| 7,492,996 B2 | 2/2009 | Kowalczyk et al. |
| 7,539,387 B2 | 5/2009 | Mertesdorf et al. |
| 7,539,388 B2 | 5/2009 | Mertesdorf et al. |
| 7,591,595 B2 | 9/2009 | Lu et al. |
| 7,680,388 B2 | 3/2010 | Reagan et al. |
| 2003/0072540 A1 * | 4/2003 | Huang ............... 385/92 |
| 2003/0077041 A1 | 4/2003 | Belaidi et al. |
| 2003/0091315 A1 * | 5/2003 | Allerellie ............... 385/135 |
| 2003/0103750 A1 * | 6/2003 | Laporte et al. ............... 385/134 |
| 2004/0028368 A1 | 2/2004 | Hileman et al. |
| 2004/0062508 A1 * | 4/2004 | Blankenship et al. ........ 385/134 |
| 2004/0211774 A1 | 10/2004 | Daoud et al. |
| 2004/0240823 A1 * | 12/2004 | Daoud ............... 385/134 |
| 2005/0094959 A1 | 5/2005 | Sibley et al. |
| 2005/0129375 A1 | 6/2005 | Elkins, II et al. |
| 2005/0145522 A1 | 7/2005 | Bloodworth et al. |
| 2005/0163448 A1 | 7/2005 | Blackwell, Jr. et al. |
| 2005/0175307 A1 | 8/2005 | Battey et al. |
| 2005/0175308 A1 | 8/2005 | Elkins, II et al. |
| 2005/0185895 A1 | 8/2005 | Keenum et al. |
| 2005/0186838 A1 | 8/2005 | Debenedictis et al. |
| 2005/0213921 A1 | 9/2005 | Mertesdorf et al. |
| 2005/0220421 A1 | 10/2005 | Keenum et al. |
| 2006/0089049 A1 | 4/2006 | Sedor |
| 2006/0093303 A1 | 5/2006 | Reagan et al. |
| 2006/0098932 A1 | 5/2006 | Battey et al. |
| 2006/0153517 A1 | 7/2006 | Reagan et al. |
| 2006/0285810 A1 | 12/2006 | Vanhentenrijk et al. |

| | | | |
|---|---|---|---|
| 2007/0104448 | A1 | 5/2007 | Allen |
| 2007/0189694 | A1 | 8/2007 | Mullaney et al. |
| 2008/0131068 | A1 | 6/2008 | Mertesdorf et al. |
| 2009/0123115 | A1 | 5/2009 | Gronvall et al. |
| 2009/0148118 | A1 | 6/2009 | Gronvall et al. |

FOREIGN PATENT DOCUMENTS

| | | | |
|---|---|---|---|
| EP | 0 511 147 A1 | | 10/1992 |
| EP | 0 805 536 A1 | | 11/1997 |
| EP | 0 844 504 A2 | | 5/1998 |
| EP | 0 851 257 A1 | | 7/1998 |
| FR | 2 853 775 A1 | | 10/2004 |
| JP | 58-105114 | | 6/1983 |
| JP | 60-169813 | | 9/1985 |
| JP | 9-15426 | | 1/1997 |
| JP | 2006215248 A | * | 8/2006 |
| WO | WO 93/22695 | | 11/1993 |
| WO | WO 95/07477 | | 3/1995 |
| WO | WO 95/07478 | | 3/1995 |
| WO | WO 96/10203 | | 4/1996 |
| WO | WO 02/06879 A1 | | 1/2002 |
| WO | WO 2008/118603 A2 | | 10/2008 |

OTHER PUBLICATIONS

Invitation to Pay Additional Fees with Partial International Search mailed May 7, 2009.

ADC Telecommunications, Above Ground Cross-Connect (AGX) Fiber Panel (AGX-1000HD) User Manual; 26 pages; ADCP-93-010 Issue 2, Jul. 1997.

ADC Telecommunications; Fiber Cable Management Products Third Edition; 22 pages; Jun. 1998.

ADC Telecommunications; Fiber Panel Products Second Edition; 16 pages; Jul. 1996.

ADC Telecommunications; FL1000 Wall-Mount Box Installation and Operation Guide; 28 pages; ADCP-90-334 Issue 1, Nov. 2004.

ADC Telecommunications; FL2000 Products; 6 pages; Nov. 1996.

ADC Telecommunications; FL2000 ™ Wall Mount Box Installation Instructions; 18 pages; ADCP-90-210 Issue 4; Jan. 1998.

ADC Telecommunications; FTD1 36-Fiber Wall Box User Manual; 15 pages; ADCP-90-250 Issue 1, Nov. 1996.

ADC Telecommunications; FTUA 4- and 12-Fiber Wall Box User Manual; 14 pages; ADCP-90-249 Issue 2, Mar. 1997.

ADC Telecommunications; Six-Fiber In-Building Wall Box Installation Instructions; 8 pages; ADCP-90-167 Issue 3, Nov. 1997.

ADC Telecommunications; Value-Added Module System; 8 pages; Jun. 1998.

ADC Telecommunications; Wall Mount Box 12/24/36 Fiber User Manual; 16 pages; ADCP-90-149 Issue 3, Jul. 1997.

Complaint relating to Civil Action No. 08-CV-05222-RHK-JJKM, filed Sep. 19, 2008.

* cited by examiner

DROP TERMINAL RELEASABLE ENGAGEMENT MECHANISM

CROSS REFERENCE TO RELATED APPLICATIONS

This application claims the benefit of U.S. Provisional Patent Application Ser. No. 60/978,642, filed Oct. 9, 2007, which is hereby incorporated by reference in its entirety.

TECHNICAL FIELD

The present disclosure relates to fiber optic cable termination systems, and more particularly, to releasable engagement mechanisms for drop terminals used in fiber optic cable termination systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

Fiber optic telecommunication technology is becoming prevalent in part because service providers want to deliver high bandwidth communication capabilities to subscribers. One such technology is referred to as passive optical networks (PONS). PONS may use optical fibers deployed between a service provider central office, or head end, and one or more end user premises. A service provider may employ a central office, or head end, containing electronic equipment for placing signals onto optical fibers running to user premises. End user premises may employ equipment for receiving optical signals from the optical fibers. In PONS, the central office, or head end, transmission equipment and/or the transmission equipment located at the end user premises may, respectively, use a laser to inject data onto a fiber in a manner that may not require the use of any active components, such as amplifiers between the central office, or head end, and/or the end user premises. In other words, only passive optical components, such as splitters, optical fibers, connectors and/or splices, may be used between a service provider and an end user premises in PONS. PONS may be attractive to service providers because passive networks may be less costly to maintain and/or operate as compared to active optical networks and/or older copper based networks, such as a public switched telephone network (PSTN). In addition to possibly being less expensive than other network topologies, PONS may provide sufficient bandwidth to meet a majority of end users' high bandwidth communication needs into the foreseeable future.

In PONS, transmission equipment may transmit signals containing voice, data and/or video over a fiber strand to the premises. An optical fiber may be split using, for example, passive optical splitters so that signals are dispersed from one fiber (the input fiber) to multiple output fibers running to, for example, user premises from a convergence point in the network. An optical fiber routed to a user's premises may be routed via a fiber drop terminal en route to the premises. At the fiber drop terminal, signals appearing on one or more optical fibers may be routed to one or more end user premises. Fiber drop terminals may be mounted in aerial applications, such as near the tops of utility poles, along multi-fiber and/or multi-conductor copper strands suspended between utility poles. Fiber drop terminals may also be installed in junction boxes mounted at ground level and/or in below-grade vaults where utilities are run below ground. Example fiber drop terminals are disclosed at U.S. Pat. No. 7,120,347; U.S. Patent Publication No. US 2005/0213921 (now U.S. Pat. No. 7,292,763); and U.S. Patent Publication No. US 2006/0153517 (now U.S. Pat. No. 7,680,388).

SUMMARY

An aspect of the present disclosure relates to a terminal for mounting to a fiber distribution cable. The terminal includes a base and a cover releasably engaged to the base by a releasable engagement mechanism. The releasable engagement mechanism includes a resilient latch having a base end and a free end. The free end defines a plurality of openings. The releasable engagement mechanism further includes a plurality of protrusions having a lip and a sloped surface. The plurality of protrusions is adapted for engagement with the plurality of openings of the resilient latch.

Another aspect of the present disclosure relates to a terminal for mounting to a fiber distribution cable. The terminal includes a base having a base protrusion that extends outwardly from each longitudinal side of the base. Each base protrusion defines a groove that opens toward a rear side of the base. The terminal further includes a cover having a cover protrusion that extends outwardly from each longitudinal side of the cover. Each cover protrusion defines a groove that opens toward an outer surface of the cover. Each base protrusion and each cover protrusion on each longitudinal side cooperatively define a protrusion on each longitudinal side when the base and cover are aligned. A plurality of retainers is adapted for sliding engagement with the protrusions. Each retainer defines a cavity adapted to receive one of the protrusions.

Another aspect of the present disclosure relates to a terminal for mounting to a fiber distribution cable. The terminal includes a base and a cover releasably engaged to the base by a releasable engagement mechanism. The releasable engagement mechanism includes a frame engaged with the base. The frame has a first leg connected to an oppositely disposed second leg by a crossbar. Each of the first and second legs has an end defining a slot having a slot opening. The releasable engagement mechanism further includes a pin extending outwardly from each longitudinal side of the cover. The pin is adapted to be received in the slot of the frame.

Another aspect of the present disclosure relates to a terminal for mounting a fiber distribution cable. The terminal includes a base and a cover releasably engaged to the base by a releasable engagement mechanism. The releasable engagement mechanism includes a latch disposed on one of the base and cover. The latch includes a base end defining a longitudinal axis that extends longitudinally through the base end and an oppositely disposed free end that extends outwardly from the base end in a direction that is generally perpendicular to the longitudinal axis. The free end includes a sloped surface. The releasable engagement mechanism further includes a catch disposed on one of the base and cover. The catch includes a surface adapted for engagement with the sloped surface of the latch such that engagement of the sloped surface of the latch and the surface of the catch brings the base and cover into close-fit engagement.

Another aspect of the present disclosure relates to a terminal for mounting to a fiber distribution cable. The terminal includes a base having a first hinge component with a base end protrusion engaged to a side of the base and a free end protrusion that extends outwardly in a direction that is generally perpendicular to the base end protrusion. The terminal further includes a cover having a second hinge component that extends outwardly from a surface of the cover. The second hinge component defines a hinge slot that has a hinge slot opening. The hinge slot of the second hinge component is adapted to receive the free end protrusion of the first hinge component.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
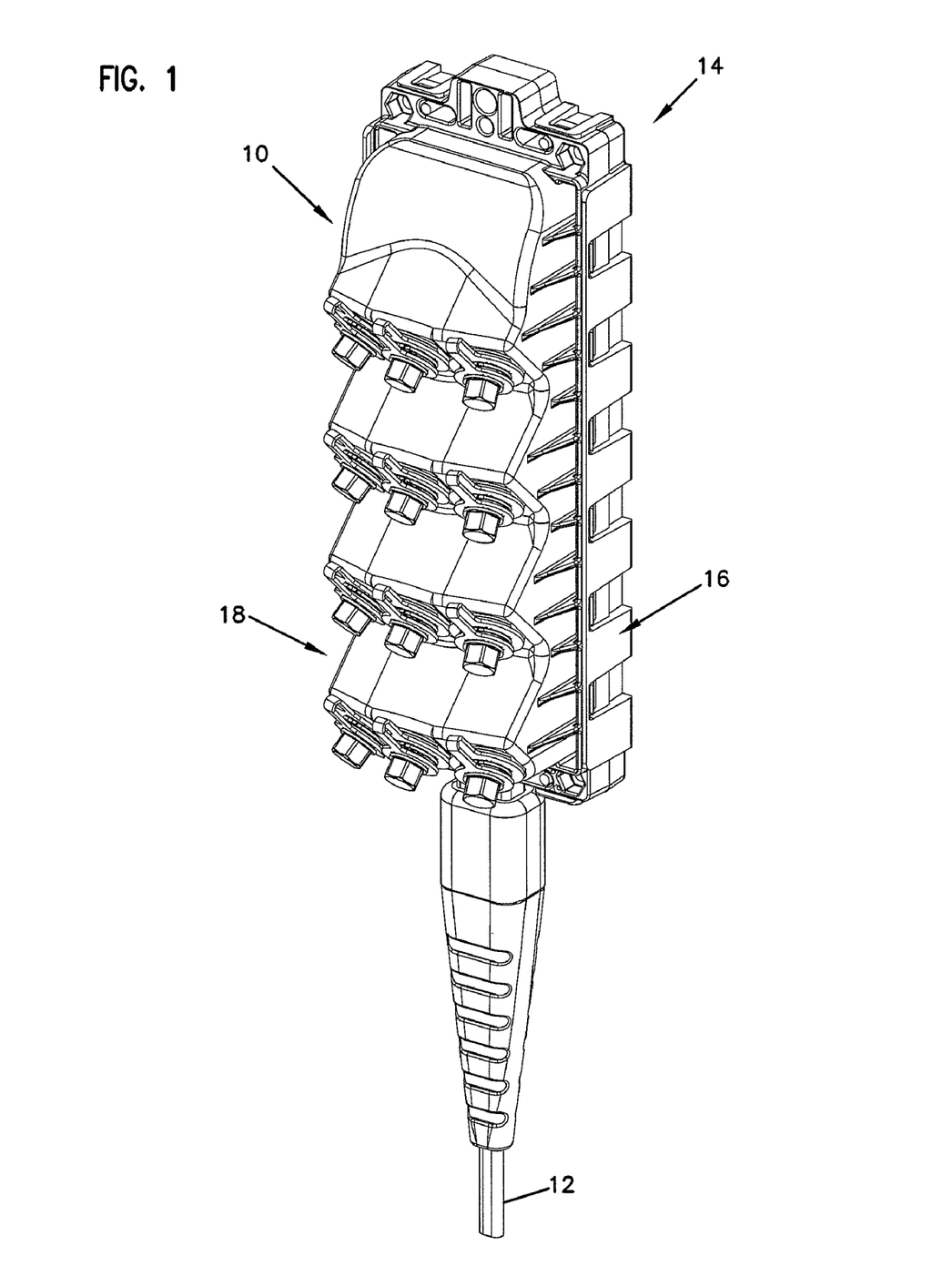
FIG. 1 is a perspective view of a terminal having features that are examples of aspects in accordance with the principles of the present disclosure.

Referring now to FIG. 1, a terminal, generally designated 10, for mounting to a fiber distribution cable 12 is shown. The terminal 10 includes a housing, generally designated 14, having a base, generally designated 16, and a cover, generally designated 18. A U.S. patent application entitled "Mini-Drop Terminal," filed on Oct. 9, 2008 and having attorney docket number 02316.2601USU1, which is hereby incorporated by reference in its entirety, discloses a base 16 and a cover 18 that would be suitable for use with the terminal 10.

Figure 2:
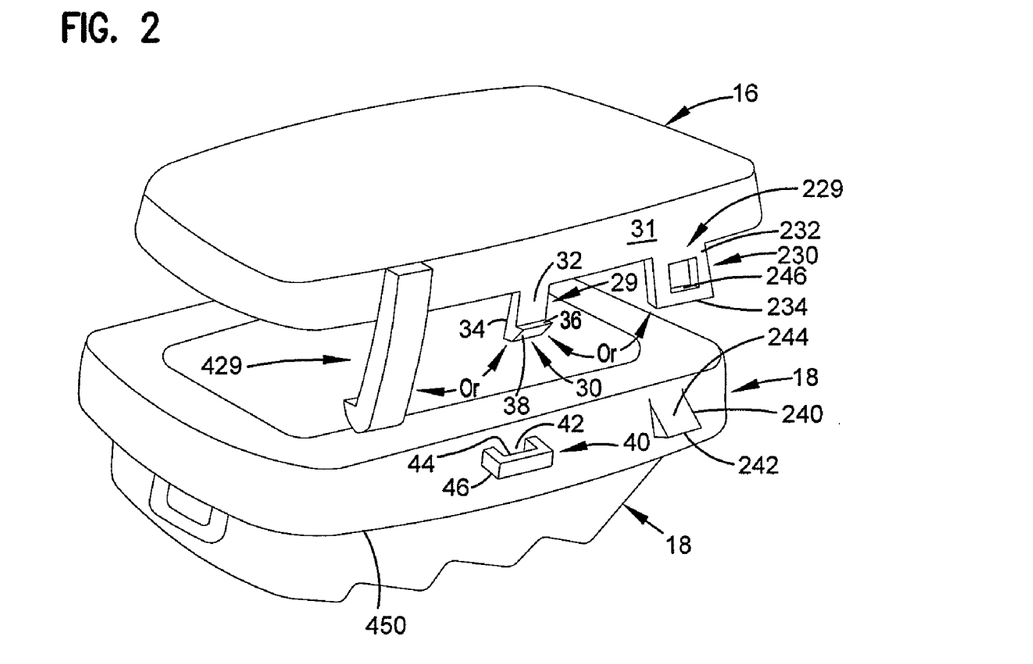
FIG. 2 is a perspective view of embodiments of a releasable engagement mechanism having features that are examples of aspects in accordance with the principles of the present disclosure.

Referring now to FIG. 2, a releasable engagement mechanism, generally designated 29, for the housing 14 will be described. In one embodiment, the releasable engagement mechanism 29 includes a resilient latch, generally designated 30, disposed on an outer perimeter surface 31 of the base 16. The resilient latch 30 includes a base end 32 and an oppositely disposed free end 34. The base end 32 is in connected engagement with the base 16. The free end 34 of the resilient latch 30 extends outwardly from the base 16 in a direction that is generally perpendicular to an outer edge 33 of the base 16. In the subject embodiment, the base end 32 of the resilient latch 30 is integral with the base 16. The free end 34 includes a lip 36 and a sloped surface 38. In the subject embodiment, the lip 36 protrudes outwardly from the outer perimeter surface 31 of the base 16 in a direction that is generally perpendicular to the outer perimeter surface 31.

In the subject embodiment of FIG. 2, the cover 18 includes a catch 40. The catch 40 includes an opening 42 adapted to receive the free end 34 of the resilient latch 30. To secure the base 16 to the cover 18, the base 16 is aligned with the cover 18 and pressed toward the cover 18. As the base 16 is pressed toward the cover 18, the sloped surface 38 of the resilient latch 30 engages an edge 44 of the catch 40. As the base 16 continues to be pressed toward the cover 18, the free end 34 of the resilient latch 30 is flexed inwardly toward the base 16 so that the free end 34 extends through the opening 42 of the catch 40. The base 16 is pressed toward the cover 18 until the free end 34 of the resilient latch 30 springs back from its flexed position such that the lip 36 engages a back side 46 of the catch 40.

In an alternative embodiment of a releasable engagement mechanism 229 shown in FIG. 2, the releasable engagement mechanism 229 includes a latch 230 having a base end 232 connected to the base 16 and an oppositely disposed free end 234. The latch 230 defines an opening 235 disposed between the base end 232 and the free end 234. In the subject embodiment, the opening 235 is a square shaped opening. It will be understood, however, that the scope of the present disclosure is not limited to the opening 235 being a square shaped opening.

In this alternative embodiment, the cover 18 includes protrusion 240. The protrusion 240 includes a lip 242 and a sloped surface 244. During engagement of the base 16 to the cover 18, the free end 234 of the latch 230 engages the sloped surface 244. As the free end 234 engages the sloped surface 244 of the latch 230, the free end 234 is flexed outwardly from the base 16 until the protrusion 240 extends through the opening 235 in the latch 230. With the protrusion 240 extending through the opening 235, the lip 242 of the protrusion 240 engages an edge surface 246 of the opening 235.

Figure 3:
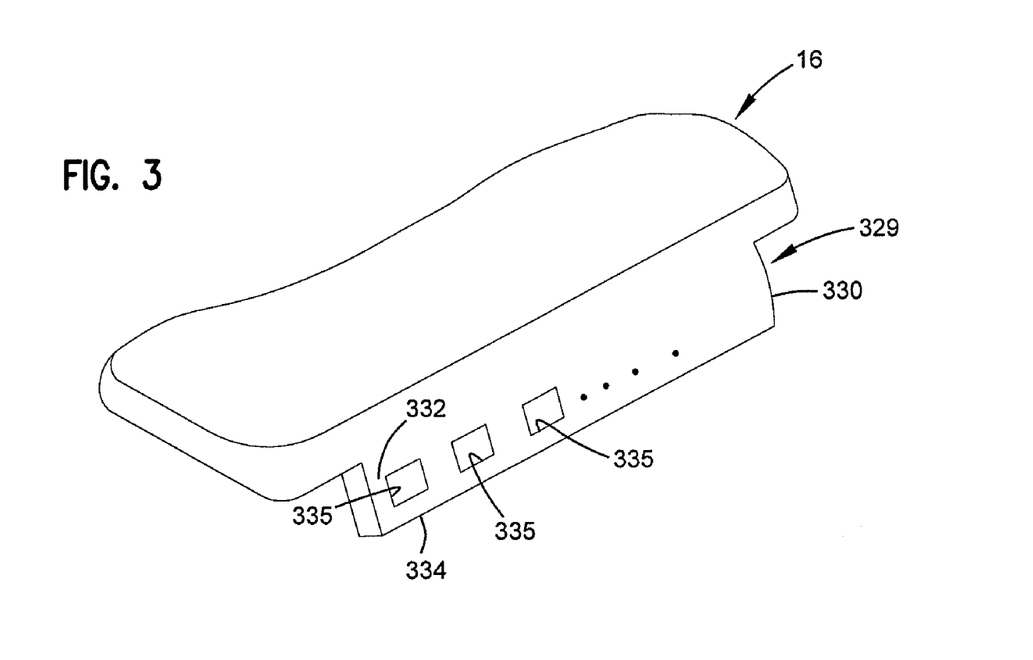
FIG. 3 is a perspective view of a base suitable for use with the terminal of FIG. 1.

Referring now to FIG. 3, an alternate embodiment of a releasable engagement mechanism 329 is shown. The releasable engagement mechanism 329 includes a latch 330 having a base end 332 connected to the base 16 and an oppositely disposed free end 334. The latch 330 defines a plurality of openings 335 disposed between the base end 332 and the free end 334. In the subject embodiment, the opening 335 is a square shaped opening. Each of the openings 335 is adapted for engagement with a protrusion 240 (shown in FIG. 2) disposed on the cover 18.

Figure 4A:
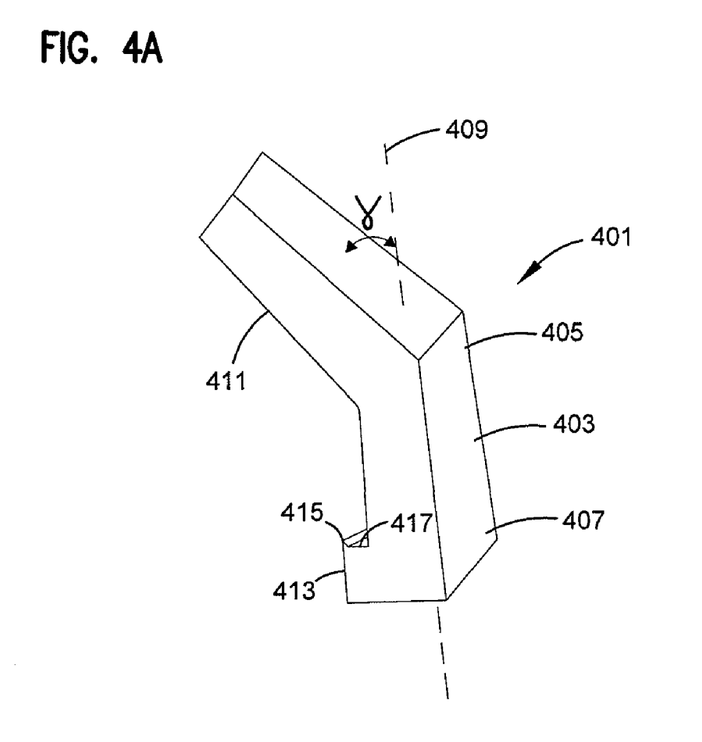
FIG. 4A is a perspective view of a tool suitable for use with the base of FIG. 3.

Referring now to FIG. 4A, a releasing tool 401 for opening the releasable engagement mechanism 329 is shown. The tool 401 includes a body portion 403 having a first end portion 405 and an oppositely disposed second end portion 407. The body portion 403 further includes a longitudinal axis 409 (shown as a dashed line in FIG. 4A).

A handle portion 411 is in connected engagement with the body portion 403 at the first end portion 405. In the subject embodiment, the handle portion 411 is integral with the body portion 403. The handle portion 411 extends outwardly from the body portion 403. In the subject embodiment, the handle portion 411 extends outwardly from the body portion 403 at an oblique angle γ. It will be understood, however, that the subject embodiment is not limited to the handle portion 411 extending outwardly from the body portion 403 at an oblique angle γ.

A release portion 413 is in connected engagement with the body portion 403 at the second end portion 407. In the subject embodiment, the release portion 413 extends outwardly from the body portion 403 in a direction that is generally perpendicular to the longitudinal axis 409. The release portion 413 includes an edge 415 disposed on an inner surface 417 of the release portion 413. In the subject embodiment, the edge 415 is generally wedge shaped.

Figure 4B:
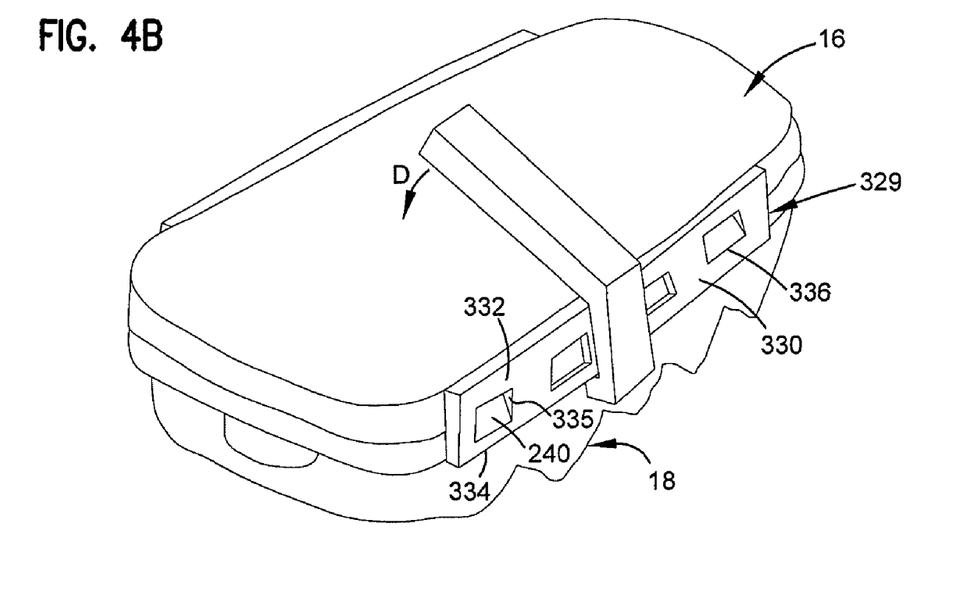
FIG. 4B is a perspective view of the tool of FIG. 4A and the base of FIG. 3.

Referring now to FIGS. 4A and 4B, a method for disengaging the releasable engagement mechanism 329 with the releasing tool 401 will be described. The edge 415 of the releasing portion 413 of the releasing tool 401 is inserted between the free end 334 of the latch 330 and the cover 18. With the edge 415 inserted between the free end 334 of the latch 330 and the cover 18, the releasing tool 401 is positioned such that the body portion 403 is adjacent to the latch 330 and the handle portion 411 is positioned above the base 16. The handle portion 411 is then pressed downward toward the base 16 in a direction "D" (shown as an arrow in FIG. 4B). As the handle portion 411 is pressed downward, the first end portion 405 of the body portion 403 engages an edge portion 419 of the latch 330 causing the releasing portion 413 to move in an outwardly direction from the cover 18. As the releasing portion 413 moves outwardly with respect to the cover 18, the edge 415 flexes the free end 334 of the latch 330 in an outwardly direction relative to the cover 18. The handle portion 411 is pressed downwardly until an edge surface 336 of each of the openings 335 is disengaged from the lips 242 of the protrusions 240. When the edge surfaces 336 of the openings 335 of the latch 330 are disengaged from the lips 242 of the protrusion 240, the base 16 can be removed from the cover 18.

Referring again to FIG. 2, an alternate embodiment of a releasable engagement mechanism 429 is shown. The releasable engagement mechanism 429 includes a resilient latch, generally designated 430, having a base end 432 in connected engagement with the outer perimeter surface 31 of the base 16 and an oppositely disposed free end 434. The free end 434 extends outwardly from the base 16 in a direction that is generally perpendicular to the outer edge 33 of the base 16. The free end 434 includes a lip 436 and a sloped surface 438. The lip 436 extends inwardly toward the base 16 in a direction that is generally perpendicular to the outer perimeter surface 31 of the base 16. In one embodiment, the resilient latch 430 is adapted for engagement with the catch 40 disposed on the cover 18. In another embodiment, the resilient latch 430 is adapted for engagement with an edge portion 450 of the cover 18.

Figure 5:
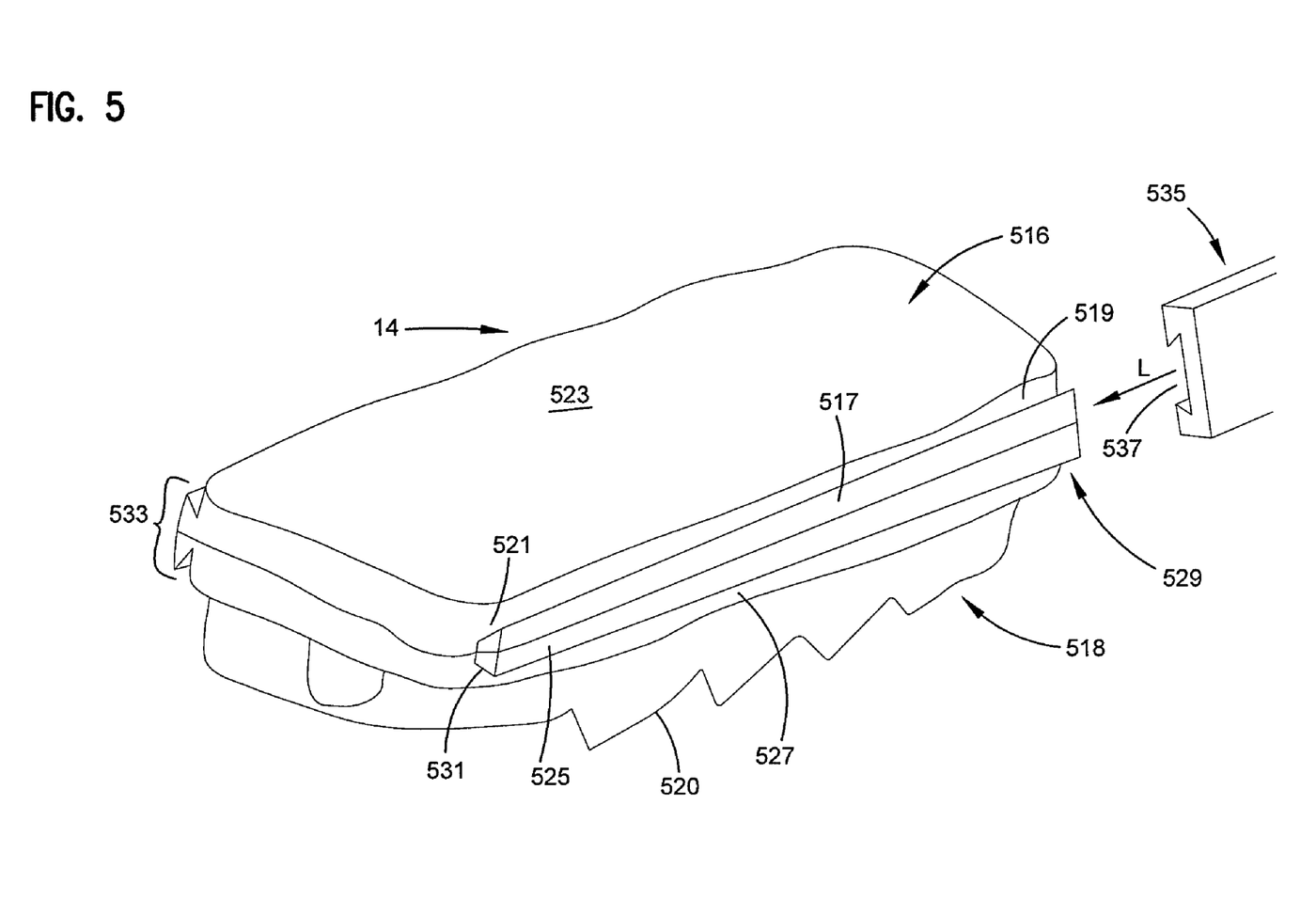
FIG. 5 is a perspective view of an alternate embodiment of a releasable engagement mechanism suitable for use with the terminal of FIG. 1.

Referring now to FIG. 5, an alternate embodiment of a releasable engagement mechanism 529 is shown. The releasable engagement mechanism 529 includes a base protrusion 517 disposed on each longitudinal side 519 of a base 516 such that the base protrusion 517 extends outwardly from the longitudinal side 519. The base protrusion 517 defines a groove 521 that opens towards a rear side 523 of the base 516. In the subject embodiment, the groove 521 is wedge shaped. It will be understood, however, that the scope of the present disclosure is not limited to the groove 521 being wedge shaped.

A cover protrusion 525 is disposed on each longitudinal side 527 of a cover 518 such that the cover protrusion 525 extends outwardly from the longitudinal side 527. The cover protrusion 525 defines a groove 531 that opens towards an outer surface 520 of the cover 518. In the subject embodiment, the groove 531 is wedge shaped. It will be understood, however, that the scope of the present disclosure is not limited to the groove 531 being wedge shaped.

The base protrusion 517 and the cover protrusion 525 cooperatively define a protrusion 533 when the base 516 and the cover 518 are properly aligned. In the subject embodiment, the protrusion 533 has a dove-tailed configuration. It will be understood, however, that the scope of the present disclosure is not limited to the protrusion 533 having a dove-tailed configuration. A retainer 535 is adapted for sliding engagement with the protrusion 533 defined by the base protrusion 517 and the cover protrusion 525. In the subject embodiment, the length of the retainer 535 is generally the length of the protrusion 533. It will be understood, however, that the scope of the present disclosure is not limited to the length of the retainer 535 generally being the length of the protrusion 533. The retainer 535 includes a cavity 537 that extends along the longitudinal length of the retainer 535. The cavity 537 is adapted to receive the protrusion 533. In the subject embodiment, therefore, the cavity 537 is dove-tail shaped.

With the base 516 and the cover 518 properly mated and aligned, the cavity 537 in the retainer 535 is aligned with the protrusion 533. The retainer 535 then slides over the protrusion 533 in a longitudinal direction "L" (shown as an arrow in FIG. 5). With the protrusion 533 disposed in the cavity 537 of the retainer 535, the base 516 and the cover 518 are securely engaged.

Figure 6:
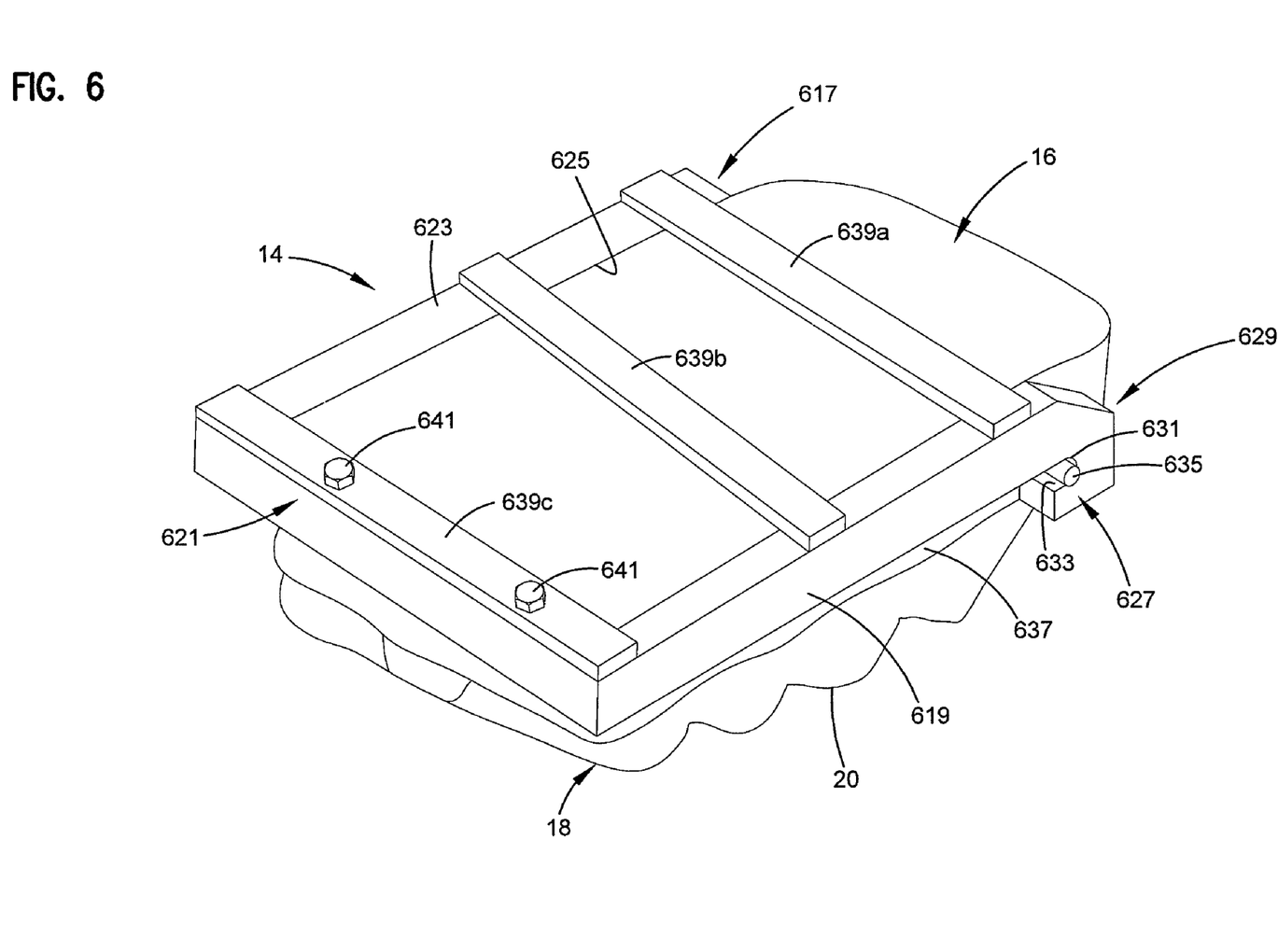
FIG. 6 is a perspective view of an alternate embodiment of a releasable engagement mechanism suitable for use with the terminal of FIG. 1.

Referring now to FIG. 6, an alternate embodiment of a releasable engagement mechanism 629 is shown. The releasable engagement mechanism 629 includes a frame 617. In the subject embodiment, the frame 617 is a U-shaped frame having a first leg 619 which is connected to a cross-bar 621 and a second leg 623 oppositely disposed from the first leg 619 on the cross-bar 621. An opening 625 is defined between the first leg 619 and the second leg 623. The opening 625 of the frame 617 is adapted to receive the base 16. While the frame 617 is shown as being separate from the base 16, it will be understood that the scope of the present disclosure is not limited to the frame 617 being separate from the base 16 as the frame 617 could be integral with the base 16.

In the subject embodiment, the first and second legs 619, 623 of the frame 617 include an end 627. In the subject embodiment, the end 627 is hook-shaped. The end 627 defines a slot 631 having a slot opening 633.

The cover 18 includes pins 635. In the subject embodiment, and by way of example only, there are two pins 635 with one of the pins 635 extending outwardly from each longitudinal side 637 of the outer surface 20. The pin 635 is adapted to be received in the slot 631 through the slot opening 633 of the end 627 of the frame 617.

The frame 617 further includes a plurality of supports 639. In the subject embodiment, and by way of example only, there are three supports 639a, 639b, 639c. Two of the supports 639a, 639b are connectedly engaged with the first and second legs 619, 623 and extend across the opening 625 in a direction that is generally perpendicular to the first and second legs 619, 623. The third support 639c is connectedly engaged with the first and second legs 619, 623 and the cross-bar 621. The third support 639c includes a plurality of holes. With the base 16 inserted in the opening 625 of the frame 617 and the pin 635 of the cover 18 inserted in the slot 631 of the frame 617, the plurality of holes in the third support 639c are aligned with holes in the base 16 and the cover 18. Fasteners 641 (e.g., bolts, screws, etc.) are inserted through the holes in the frame 617 and the base 16 and are in threaded engagement with the cover 18.

Figure 7:
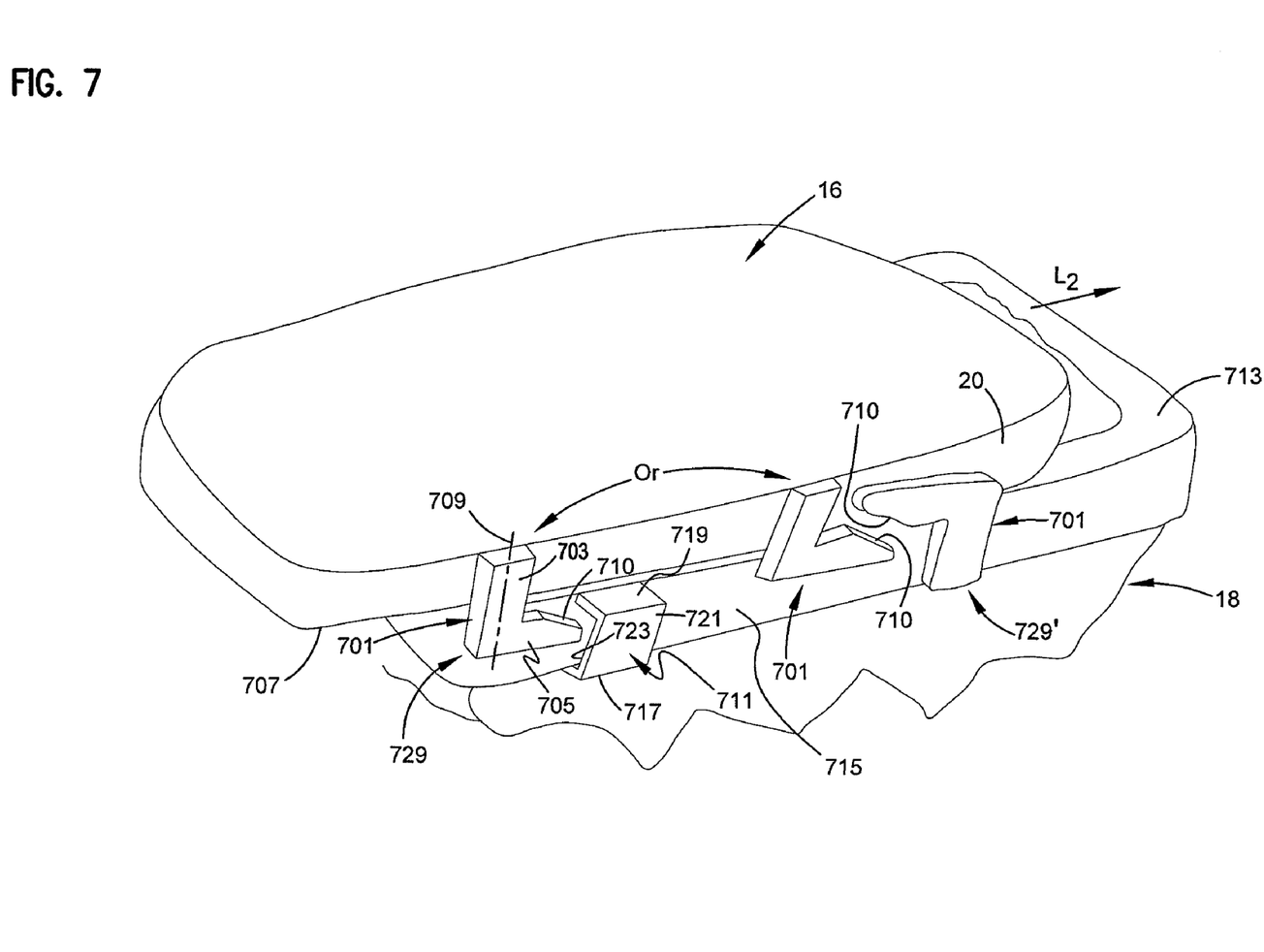
FIG. 7 is a perspective view of an alternate embodiment of a releasable engagement mechanism suitable for use with the terminal of FIG. 1.

Referring now to FIG. 7, an alternate embodiment of a releasable engagement mechanism 729 is shown. The base 16 includes a latch 701 disposed on the outer perimeter surface 20. The latch 701 includes a base end 703 and an oppositely disposed free end 705. In the subject embodiment, a portion of the base end 703 is connectedly engaged with the base 16. In another embodiment, the portion of the base end 703 is integral with the base 16. The base end 703 of the latch 701 extends outwardly from the base 16 in a direction that is generally perpendicular to an inner side 707 of the base 16. The base end 703 includes a longitudinal axis 709 (shown as a dashed line in FIG. 7) that extends longitudinally through the base end 703.

The free end 705 extends outwardly from the base end 703 in a direction that is generally perpendicular to the longitudinal axis 709. The free end 705 of the latch 701 includes a sloped surface 710 In the subject embodiment, the catch 711 is connectedly engaged with the cover 18 and disposed near a rear surface 713 of the cover 18 on a peripheral surface 715. The catch 711 defines a first side 717, an oppositely disposed second side 719, and a connecting side 721 that is connectedly engaged with the first and second sides 717, 719. The peripheral surface 715 of the cover 18 and the first, second, and connecting sides 717, 719, 721 of the catch 711 define a latch opening 723 through the catch 711. The latch opening 723 is adapted for engagement with the latch 701 disposed on the base 16.

To engage the latch 701 disposed on the base 16 with the catch 711 disposed on the cover 18, the inner side 707 of the base 16 is mated to the rear surface 713 of the cover 18 such that the base 16 is offset from the cover 18. With the base 16 offset from the cover 18, the free end 705 of the latch 701 is positioned adjacent to the latch opening 723 of the catch 711. The base 16 is then moved in a longitudinal direction "$L_2$" (shown as an arrow in FIG. 7) relative to the cover 18. As the base 16 moves in the longitudinal direction $L_2$, the sloped surface 710 of the latch 701 engages the second side 719 of the catch 711. As the base 16 continues to move in the longitudinal direction $L_2$, the engagement between the sloped surface 710 of the latch 701 and the second side 719 of the catch 711 pulls the base 16 closer to the cover 18 in order to establish a close-fit engagement between the inner side 707 of the base 16 and the rear surface 713 of the cover 18. This close-fit engagement aids in protecting the contents of the terminal 10 against dust, rain, snow, and ice.

Referring still to FIG. 7, an alternate embodiment of a releasable engagement mechanism 729' is shown. In this embodiment, one latch 701 is disposed on the outer perimeter surface 20 of the base 16 and another latch 701 is disposed on the peripheral surface 715 of the cover 18. The latches 701 are oriented on the base 16 and the cover 18 to allow for engagement between the latch 701 on the base 16 and the latch 701 on the cover 18. In the subject embodiment, the latch 701 on the base 16 and the latch 701 on the cover 18 are generally similar. It will be understood, however, that the scope of the present disclosure is not limited to the latch 701 on the base 16 and the latch 701 on the cover 18 being generally similar.

In this embodiment, the releasable latch mechanism 729' is engaged by moving the base 16 in the longitudinal direction $L_2$ relative to the cover 18. As the base 16 is moved in the longitudinal direction $L_2$ relative to the cover 18, the sloped surface 710 of the latch 701 disposed on the base 16 engages the sloped surface 710 of the latch 701 disposed on the cover 18. As the base 16 continues to move in the longitudinal direction $L_2$, the engagement of the sloped surfaces 710 of the latches 701 pulls the base 16 closer to the cover 18 in order to establish a close-fit engagement between the inner side 707 of the base 16 and the rear surface 713 of the cover 18.

Figure 8:
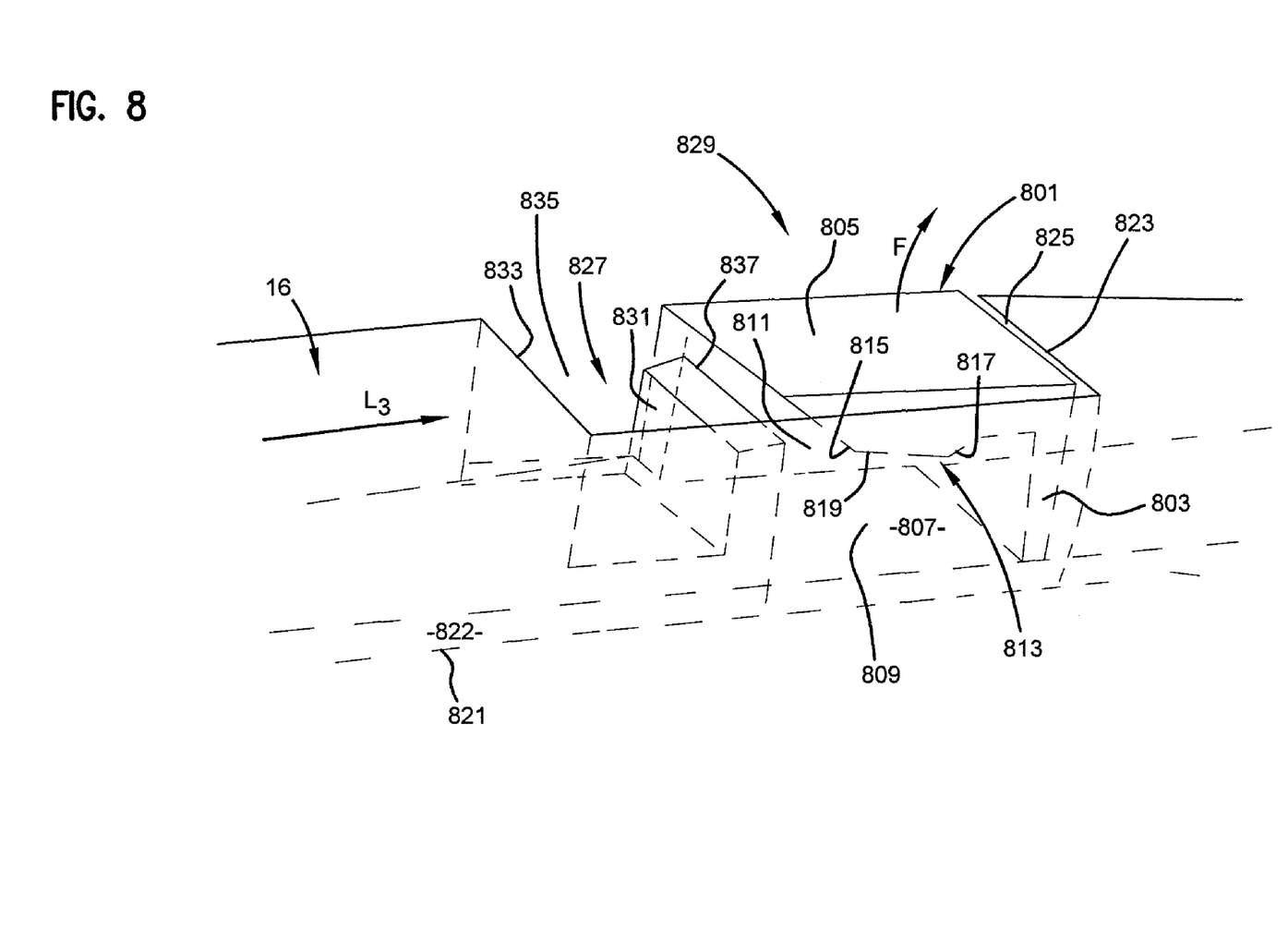
FIG. 8 is a perspective view of an alternate embodiment of the releasable engagement mechanism of FIG. 7.

Referring now to FIG. 8, an alternate embodiment of a releasable engagement mechanism 829 is shown. The cover 18 includes a resilient protrusion 801. The resilient protrusion 801 includes a base portion 803 and a free portion 805. The base portion 803 is connectedly engaged with a rear peripheral surface 807 of the cover 18 such that the base portion 803 extends outwardly from the rear peripheral surface 807 in a generally perpendicular direction.

The free portion 805 extends outwardly from the base portion 803 such that the base and free portions 803, 805 of the resilient protrusion 801 and the rear peripheral surface 807 of the cover 18 define a gap 809 having an open end 811. The free portion 805 includes an inner surface, generally designated 813, that faces the gap 809 and the rear peripheral surface 807 of the cover 18. The inner surface 813 includes a first sloped surface 815 and an oppositely inclined second sloped surface 817. In the subject embodiment, a plateau surface 819 is disposed between the first and second sloped surfaces 815, 817.

An inner surface 821 of the base 16 includes an outer peripheral edge surface 822 that defines an opening 823 having a thru portion 825 and a latch portion 827. In the subject embodiment, the thru portion 825 of the opening 823 extends through the outer peripheral surface 821 of the base 16. The thru portion 825 is sized slightly larger than the resilient protrusion 801 of the cover 18.

The latch portion 827 includes a lip 831 protruding inwardly from the outer peripheral edge surface 822 in a generally perpendicular direction such that the lip 831 extends into a portion of the opening 823. The lip 831 and a side 833 of the opening 823 adjacent to the latch portion 827 define a space 835 disposed between the lip 831 and the side 833.

To engage the resilient protrusion 801 of the cover 18 with the latch portion 827 of the opening 823 of the base 16, the base 16 is aligned with the cover 18 such that the rear protrusion 801 of the cover 18 extends into the thru portion 825 of the opening 823 of the base 16. With the rear protrusion 801 disposed in the thru portion 825 of the opening 823, the base 16 is moved in a longitudinal direction $L_3$ (shown as an arrow in FIG. 8) relative to the cover 18. As the base 16 is moved in the longitudinal direction $L_3$, the first sloped surface 815 of the free portion 805 of the resilient protrusion 801 engages an outer edge 837 of the lip 831 of the latch portion 827 of the opening 823. As the base 16 continues to move in the longitudinal direction $L_3$, the free portion 805 flexes outwardly in a direction "F." The base 16 is moved in the longitudinal direction L3 until the lip 831 is positioned between the base portion 803 and the second sloped surface 817.

Figure 9:
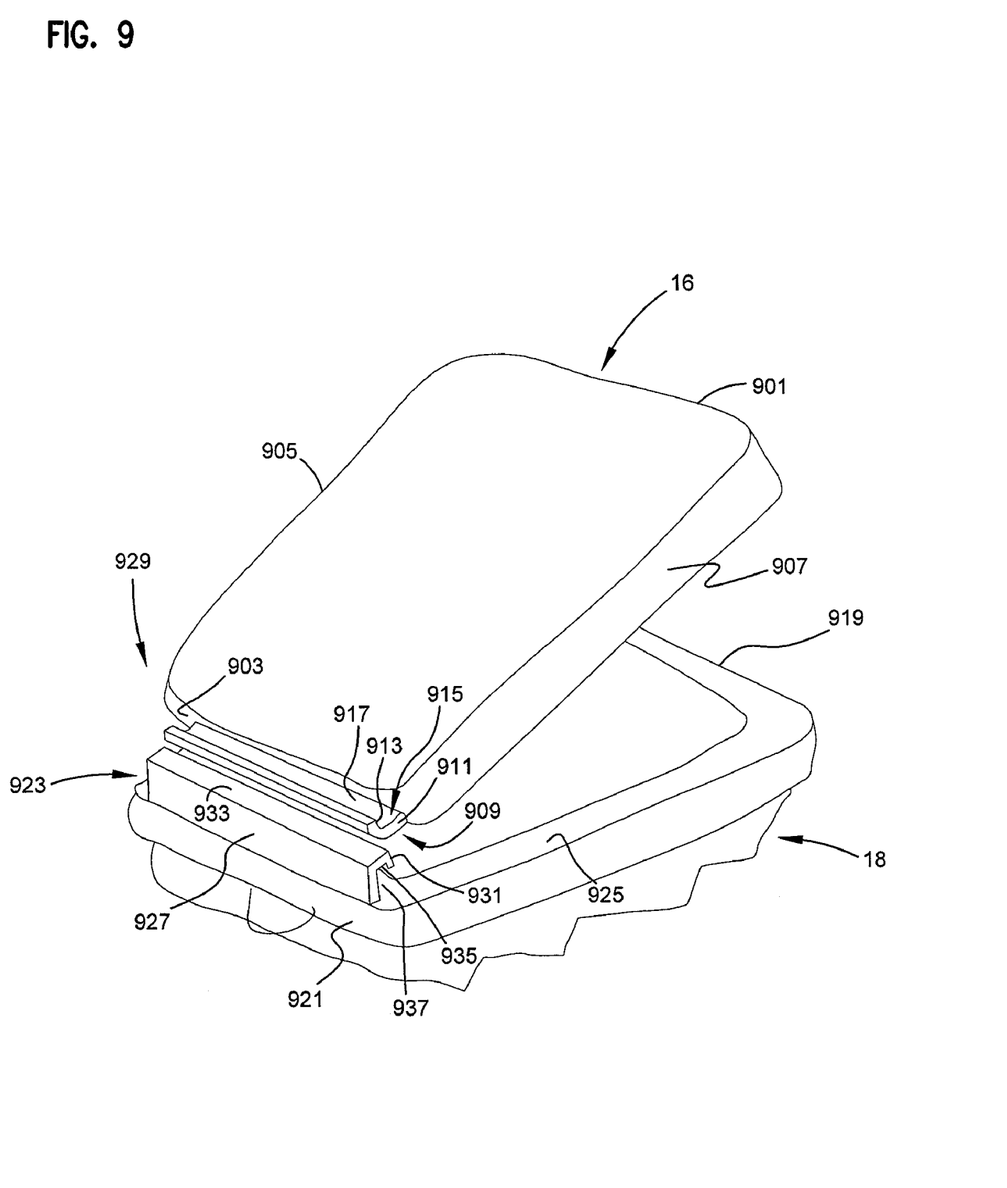
FIG. 9 is a perspective view of an alternate embodiment of a releasable engagement mechanism suitable for use with the terminal of FIG. 1.

Referring now to FIG. 9, an alternate embodiment of a releasable engagement mechanism 929 is shown. The base 16 of the terminal 10 includes a top side 901, a bottom side 903, a left side 905 and a right side 907. A first hinge component 909 is disposed on the bottom side 903 of the base 16. In the subject embodiment, the first hinge component 909 includes a base end protrusion 911 that is connectedly engaged with the bottom side 903 of the base 16 such that the base end protrusion 911 extends outwardly from the bottom side 903 in a generally perpendicular direction.

The first hinge component 909 further includes a free end protrusion 913 that extends outwardly from the base end protrusion 911. In the subject embodiment, the free end protrusion 913 extends outwardly in a direction that is generally perpendicular to the base end protrusion 911. The bottom side 903 of the base and the base and free end protrusions 911, 913 of the first hinge component 909 cooperatively define a hinge opening 915 having an open end 917. In the subject embodiment, the first hinge component 909 is L-shaped. It will be understood, however, that the scope of the present disclosure is not limited to the first hinge component 909 being L-shaped.

The cover 18 includes a top end 919 and an oppositely disposed bottom end 921. A second hinge component 923 extends outwardly from a rear surface 925 of the cover 18 at the bottom end 921. In the subject embodiment, the second hinge component 923 is hook shaped having a first leg portion 927 and a second leg portion 931 and a connection portion 933 in connected engagement with the first and second leg portions 927, 931. The first and second leg portion 927, 931 and the connection portion 933 cooperatively define a hinge slot 935 having a hinge slot opening 937. The hinge slot 935 is adapted to receive the free end protrusion 913 of the first hinge component 909.

To engage the releasable engagement mechanism 929, the base 16 is oriented with respect to the cover 18 such that the free end portion 913 of the first hinge component 909 is positioned at the hinge slot opening 937 of the second hinge component. In this orientation, the distance between the top side 901 of the base 16 and the top end 919 of the cover 18 is greater than the distance between the bottom side 903 of the base 16 and the bottom end 921 of the cover 18. With the free end portion 913 of the first hinge component 909 positioned for insertion into the hinge slot 935 of the second hinge component 923, the distance between the top side 901 of the base 16 and the top end 919 of the cover 18 is reduced by moving the base 16 in a downward direction D2 (shown as an arrow in FIG. 9) toward the cover 18. The distance between the top side 901 of the base 16 and the top end 919 of the cover 18 is reduced until an inner surface 939 of the base 16 contacts the rear surface 925 of the cover 18. With the inner surface 939 of the base 16 contacting the rear surface 925 of the cover 18, the first and second hinge components 909, 923 are fully engaged.

A plurality of latches or resilient latches similar to the ones described above are disposed on the top side 901 of the base 16 and/or the top end 919 of the cover 18 for connectedly engaging the top side 901 of the base 16 to the top end 919 of the cover 18. It will be understood, however, that the scope of the present disclosure is not limited to the top side 901 of the base 16 or the top end 919 of the cover 18 having latches as fasteners could also be used for releasable engagement of the top side 901 and the top end 919.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A terminal assembly comprising:
   a terminal having:
      a base;
      a cover releasably engaged to the base;
      a releasable engagement mechanism releasable engaging the cover to the base, the releasable engagement mechanism including:
         a resilient latch having a base end and a free end, the base end being engaged to the base, the free end defining a plurality of holes that pass through the free end of the resilient latch;
         a plurality of protrusions disposed on the cover, each of the plurality of protrusions having a lip and a sloped surface, the plurality of protrusions adapted for releasable engagement with the plurality of holes of the resilient latch, wherein the sloped surface of each of the plurality of protrusions is adapted to flex the resilient latch outwardly during engagement of the cover and the base;
      a releasing tool including a body having a releasing portion, wherein the releasing portion is adapted to flex the resilient latch outwardly from the plurality of protrusions to disengage the cover and the base.

2. A terminal assembly as claimed in claim 1, wherein the base end of the resilient latch is integral with the base.

3. A terminal assembly as claimed in claim 1, wherein the releasing tool includes a body portion having a handle portion disposed at a first end portion and a releasing portion disposed at an opposite second end portion, the handle portion extending outwardly from the body portion at an oblique angle.

4. A terminal assembly as claimed in claim 3, wherein the releasing portion extends outwardly from the body portion in a direction that is generally perpendicular to the body portion.

5. A terminal assembly as claimed in claim 1, wherein each of the plurality of holes is square shaped.

* * * * *